(12) United States Patent
Yoo et al.

(10) Patent No.: US 7,558,179 B2
(45) Date of Patent: Jul. 7, 2009

(54) COMPATIBLE OPTICAL PICKUP USING LIGHT SOURCES FOLLOWING A COMMON OPTICAL PATH

(75) Inventors: Jang-hoon Yoo, Seoul (KR); Chul-woo Lee, Seongnam-si (KR); Jong-ryull Kim, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 11/295,594

(22) Filed: Dec. 7, 2005

(65) Prior Publication Data

US 2006/0083145 A1    Apr. 20, 2006

Related U.S. Application Data

(63) Continuation of application No. 09/877,248, filed on Jun. 11, 2001, now Pat. No. 7,035,191.

(30) Foreign Application Priority Data

Jul. 22, 2000    (KR) ............................... 2000-42257

(51) Int. Cl.
*G11B 7/00* (2006.01)
(52) U.S. Cl. ................................. 369/112.01
(58) Field of Classification Search ............... 369/44.23, 369/44.24, 112.01, 112.02, 112.1, 112.23, 369/44.41, 120, 121, 112.03, 112.05, 112.06, 369/112.07, 44.37
See application file for complete search history.

(56) References Cited

U.S. PATENT DOCUMENTS 6,043,911 A    3/2000    Yang
6,043,935 A *  3/2000    Lee ................... 369/112.05
6,084,843 A *  7/2000    Abe et al. ............. 369/112.07
6,452,880 B1 * 9/2002    Kawamura et al. ....... 369/44.37
6,574,182 B1   6/2003    Yamada et al.
6,657,931 B1   12/2003   Hashimoto et al.
6,870,805 B1 * 3/2005    Arai et al. ............. 369/112.07

FOREIGN PATENT DOCUMENTS

| CN | 1184309     | 6/1998  |
| EP | 0973160 A1  | 1/2000  |
| EP | 0996121 A2  | 4/2000  |
| JP | 3-183032    | 8/1991  |
| JP | 09306018    | 11/1997 |

(Continued)

OTHER PUBLICATIONS

US Patent 6,084,843 corresponds to Japanese Patent Publication 9-306018.

*Primary Examiner*—Nabil Z Hindi
(74) *Attorney, Agent, or Firm*—Stein McEwen, LLP (57) ABSTRACT

An optical pickup compatible with recording media having different formats, the optical pickup includes a light device module having a first light beam source and a second light beam source to emit corresponding first and second light beams having different wavelengths, a hologram light coupler to separately guide the first and second light beams along the same optical path such that the first and second light beams go toward a corresponding one of the recording media, an optical path changing element to selectively alter the optical path of an incident light beam, and an objective lens disposed on an optical path between said optical path changing element the corresponding one of the recording media to focus the first and second light beam on the corresponding one of the recording media, and a photodetector to receive the first and second light beam incident from said optical path changing element.

11 Claims, 9 Drawing Sheets

FOREIGN PATENT DOCUMENTS

| | | |
|---|---|---|
| JP | 10-228659 | 8/1998 |
| JP | 10-261240 | 9/1998 |
| JP | 10-261241 | 9/1998 |
| JP | 10-326428 | 12/1998 |
| JP | 11-250490 | 9/1999 |
| JP | 2000-48386 | 2/2000 |
| JP | 2000-76689 | 3/2000 |
| JP | 2000-15940 | 4/2000 |

* cited by examiner

COMPATIBLE OPTICAL PICKUP USING LIGHT SOURCES FOLLOWING A COMMON OPTICAL PATH

CROSS-REFERENCE TO RELATED APPLICATIONS

This application is a continuation of U.S. patent application Ser. No. 09/877,248, filed Jun. 11, 2001, issued on Apr. 25, 2006 as U.S. Pat. No. 7,035,191, which claims the benefit of Korean Application No. 2000-42257, filed Jul. 22, 2000, in the Korean Industrial Property Office, the disclosures of which are incorporated herein by reference.

BACKGROUND OF THE INVENTION

1. Field of the Invention

The present invention relates to optical pickups compatible with recording media having different formats, and more particularly, to a compact optical pickup compatible with recording media with different formats, which uses a single light device module having two light beam sources with different light wavelengths.

2. Description of the Related Art

In recent years, there has been a need for an optical pickup capable of recording information on and/or reproducing information from a digital versatile disc-read only memory (DVD-ROM) at high densities that is compatible with the compact disc (CD) family of media. The CD family of media includes the CD, the recordable CD (CD-R), the CD rewritable (CD-RW), the CD interactive (CD-I), and the CD plus graphics (CD+G) compatible media.

The standard thickness of the CD family media is 1.2 mm, whereas the thickness of DVDs has been standardized to 0.6 mm, which takes in consideration of the allowable error in the tilt angle of an optical disc and the numerical aperture (NA) of an objective lens. Accordingly, when recording information on or reproducing information from a CD using an optical pickup designed for DVDs, spherical aberrations occur due to a difference in the thicknesses therebetween. Such spherical aberration cannot provide a light intensity sufficient for recording an information (radio frequency) signal or may deteriorate a reproduction signal from the CD. Also, DVDs and CD families of media utilize different wavelengths of light for reproduction. Specifically, CDs use light having a wavelength of about 780 nm, whereas DVDs use light having a wavelength of about 650 nm. Thus, in order to be compatible with CDs, an optical pickup needs to use a light beam source capable of emitting different wavelengths of light, and capable of focusing optical spots at different focal positions.

Figure 1:
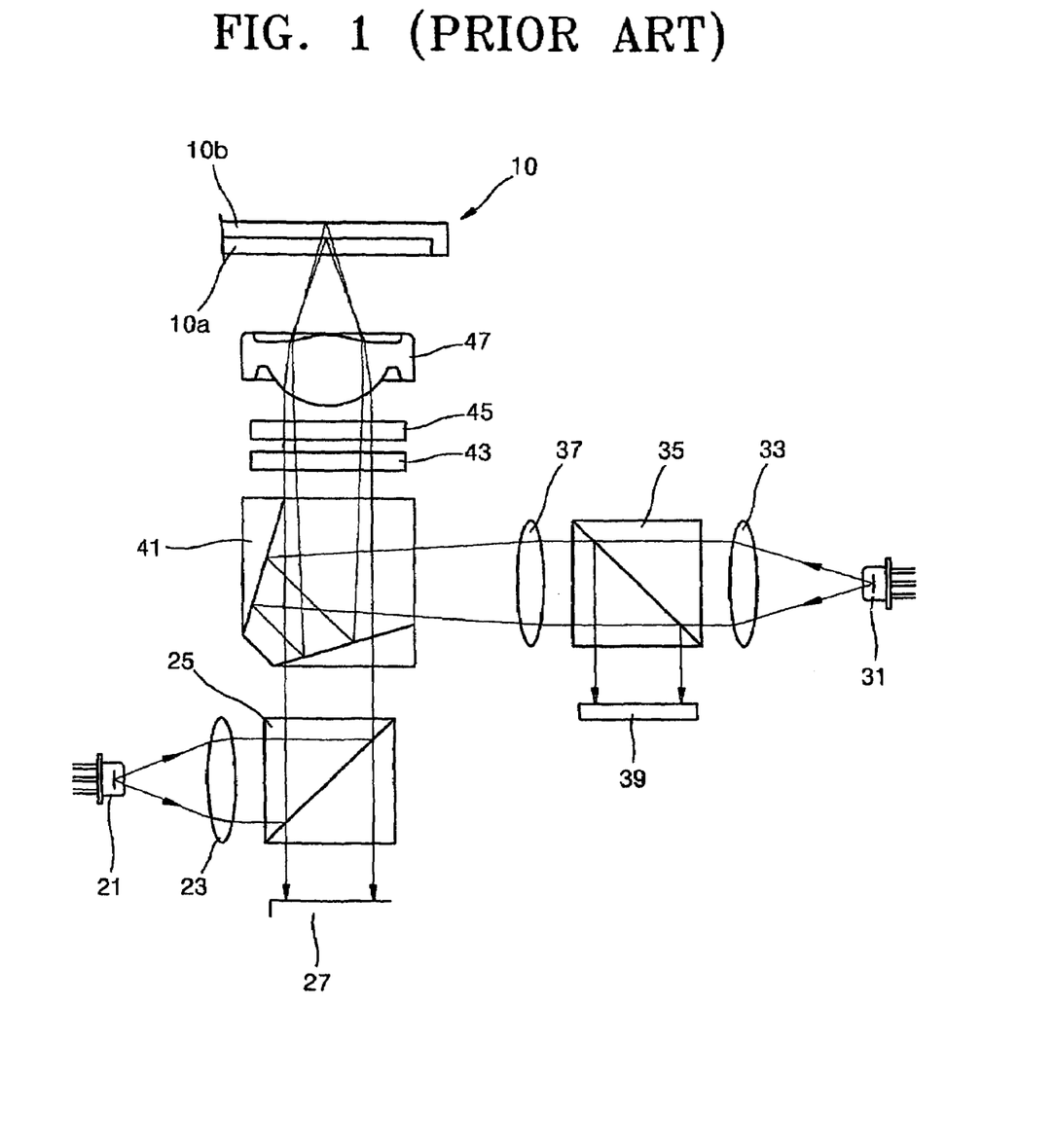
FIG. 1 is a schematic view showing the optical arrangement of a conventional compatible optical pickup.

Referring to FIG. 1, a conventional compatible optical pickup comprises a first light beam source 21 to emit a light having a wavelength of about 650 nm, and a second light beam source 31 to emit a light having a wavelength of about 780 nm. The first light beam source 21 is appropriate for a relatively thin optical disc 10a, such as a DVD, and the second light beam source 31 is appropriate for a relatively thick optical disc 10b, such as a CD. The thin optical disc 10a and the thick optical disc 10b are generically referred to as an optical disc 10.

Light emitted from the first light beam source 21 is collimated by a first collimator lens 23 to be parallel and incident on a first polarization beam splitter (PBS) 25, and then reflected by the first PBS 25 toward the thin optical disc 10a. After being reflected by the thin optical disc 10a, the reflected light is transmitted through the first PBS 25 and is received by a first photodetector 27. Here, an interference filter 41 that changes the paths of light emitted from the first and second light beam sources 21 and 31, a quarter-wave plate 43, a variable diaphragm 45, and an objective lens 47 to condense light incident are disposed on an optical path between the first PBS 25 and the thin optical disc 10a.

Light emitted from the second light beam source 31 is collimated by a second collimator lens 33 to be parallel and incident on a second PBS 35, transmitted through a condenser lens 37, and then incident on the interference filter 41. The light is reflected by the interference filter 41 and sequentially passes through the quarter-wave plate 43, the variable diaphragm 45, and the objective lens 47 to form an optical spot on the thick optical disc 10b.

Light reflected by the thick optical disc 10b is incident on the interference filter 41 through the objective lens 47, the variable diaphragm 45 and the quarter-wave plate 43, and then reflected by the interference filter 41 towards the second PBS 35. The reflected light is reflected by the second PBS 35 and received by a second photodetector 39.

The interference filter 41, which is an optical element that transmits or reflects incident light depending on the wavelength of incident light, transmits the light originating from the first light beam source 21, and reflects the light originating from the second light beam source 31. The variable diaphragm 45 has a variable aperture, and defines the size of the light spot incident on the objective lens 47 such that the light beam enters the region of the objective lens 47 with an NA less than 0.45 or 0.47. The quarter-wave plate 43 is an optical element for changing the polarization of incident light. As each of the light beams from the first and second light beam sources 21 and 31 passes the quarter-wave plate 43 two times, the polarization of the incident beams changes, and then the light beams head toward the first PBS 25 and the second PBS 353, respectively. The objective lens 47 allows light from the first and second light beam sources 21 and 31 to be focused as a light spot on the corresponding recording surfaces of the thin optical disc 10a and the thick optical disc 10b.

Although the conventional optical pickup having the configuration described above is compatible with a CD-R using two light beam sources, the use of the variable diaphragm, which is manufactured through sophisticated and expensive processes, makes assembling of such an optical pickup complicated and increases the manufacturing cost. In addition, the first and second light beam sources are separately constructed to further complicate the configuration and optical arrangement of the optical pickup.

SUMMARY OF THE INVENTION

It is an object of the present invention to provide a compact optical pickup compatible with recording media having different formats, in which first and second light beam sources with different wavelengths of light are installed in a single light device module, and the optical paths of light beams from the first and second light beam sources are adjusted using a hologram light coupler.

Additional objects and advantages of the invention will be set forth in part in the description which follows and, in part, will be obvious from the description, or may be learned by practice of the invention.

To achieve the above and other objects of the present invention, an optical pickup includes a light device module having a first light beam source and a second light beam source to selectively emit corresponding first and second light beams having different wavelengths, a hologram light coupler to separately guide the first and second light beams along the same optical path such that the first and second light beams go toward a corresponding first and second recording media, an optical path changing unit to alter the optical path of an incident light beam, and an objective lens disposed on an optical path between the optical path changing unit and the corresponding first and second recording media to focus the first and second light beams on the corresponding first and second recording media, and a photodetector to receive the first and second light beams incident from the optical path changing unit after having been reflected from the corresponding first and second recording media, and to detect an information signal and error signals from the received light beams.

BRIEF DESCRIPTION OF THE DRAWINGS

The above and other objects and advantages of the present invention will become apparent and more readily appreciated by describing in detail preferred embodiments thereof with reference to the accompanying drawings in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout.

The embodiments are described below in order to explain the present invention by referring to the figures.

Figure 2:
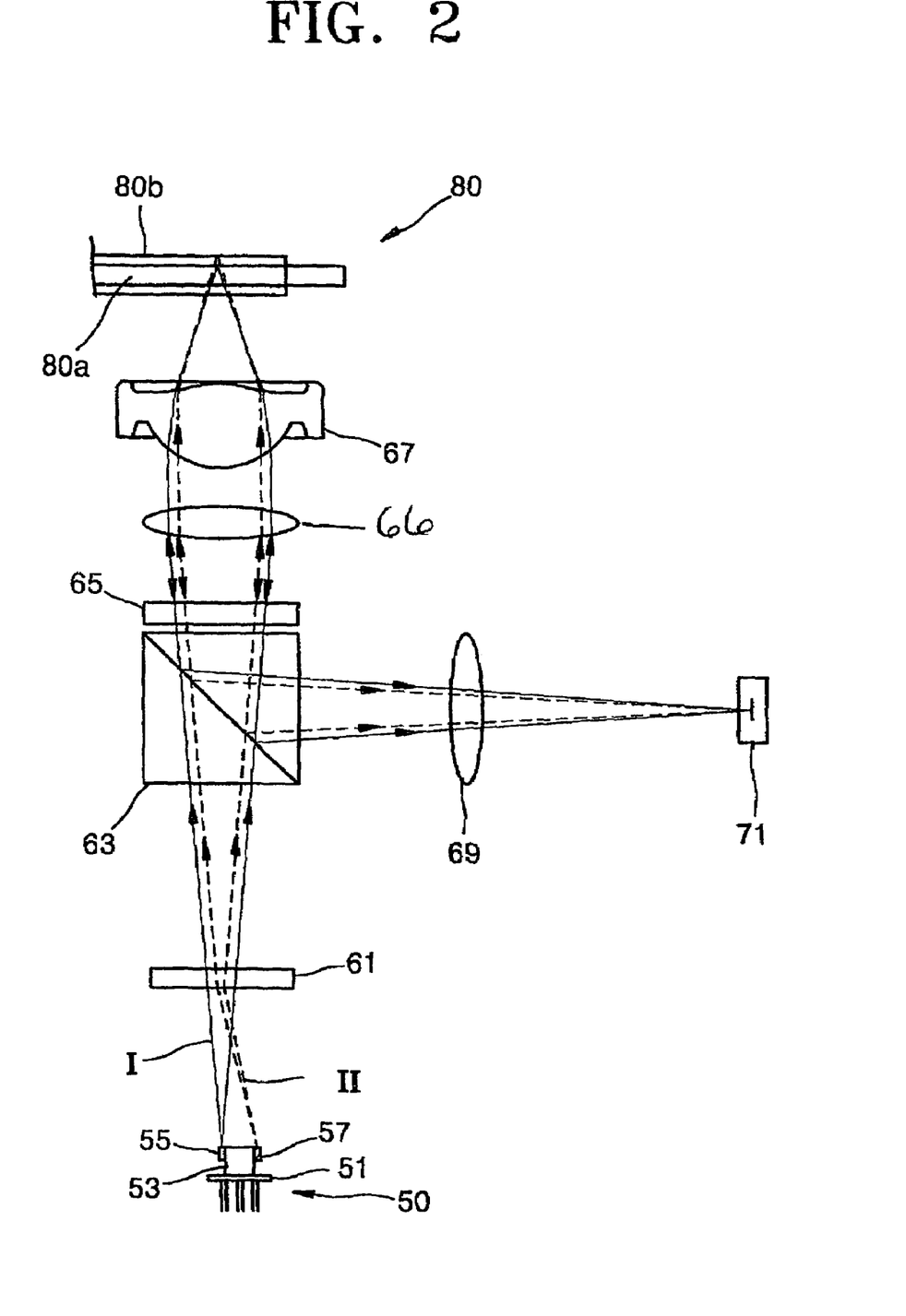
FIG. 2 is a schematic view showing the optical arrangement of an optical pickup compatible with recording media having different formats according to an embodiment of the present invention.

FIG. 2 shows an embodiment of an optical pickup compatible with recording media having different formats according to the present invention. The optical pickup includes a light device module 50, which includes first and second light beam sources 55 and 57 to emit a first light beam I and a second light beam II having different respective wavelengths, a hologram light coupler 61 by which the first and second light beams I and II are guided to travel along the same optical path, an optical path changing unit 63 to selectively alter the optical path of incident light, a collimator lens 66 to collimate incident light, an objective lens 67 to focus incident light on an optical recording medium 80, and a photodetector 71 to receive light passed through the objective lens 67, the collimating lens 66, and the optical path changing unit 63 after having been reflected from the recording medium 80.

In particular, the light device module 50 includes a substrate 51, a mount 53 on the substrate 51, and the first and second light beam sources 55 and 57 attached to corresponding sides of the mount 53. The first and second light beam sources 55 and 57 are edge emitting lasers that emit light beams at different and diverging angles. The first light beam I from the first light beam source 55 has a wavelength of about 650 nm, and is appropriate for a relatively thin optical disc 80a, such as a DVD. The second light beam II from the second light beam source 57 has a wavelength of about 780 nm, and is appropriate for a relatively thick optical disc 80b, such as CDs. The positional tolerance between the first and second light beam sources 55 and 57 can be controlled by adjusting the location of the hologram light coupler 61 on the optical path between the light device module 50 and the objective lens 67.

The hologram light coupler 61 guides the first and second light beams I and II along the same optical path and directs the first and second light beams I and II toward the optical recording medium 80. The hologram light coupler 61 has a hologram pattern 61a shown in FIG. 3 at one surface thereof to diffract and transmit incident light. The hologram light coupler 61 directly transmits the first light beam I entering along a light path that is perpendicular to the light receiving surface of the hologram light coupler 61, and diffracts and transmits most of the second light beam II along a light path that is incident at an angle such that transmitted portions of the second light beam II are parallel to the transmitted first light beam I. Transmittance of the hologram light coupler 61 is determined by the depth of the hologram pattern 61a, the pitch of the hologram pattern 61a, and the configuration of the hologram pattern 61a. As shown, the hologram pattern 61a of the hologram light coupler 61 has a stepped pattern including at least two steps.

Figure 3:
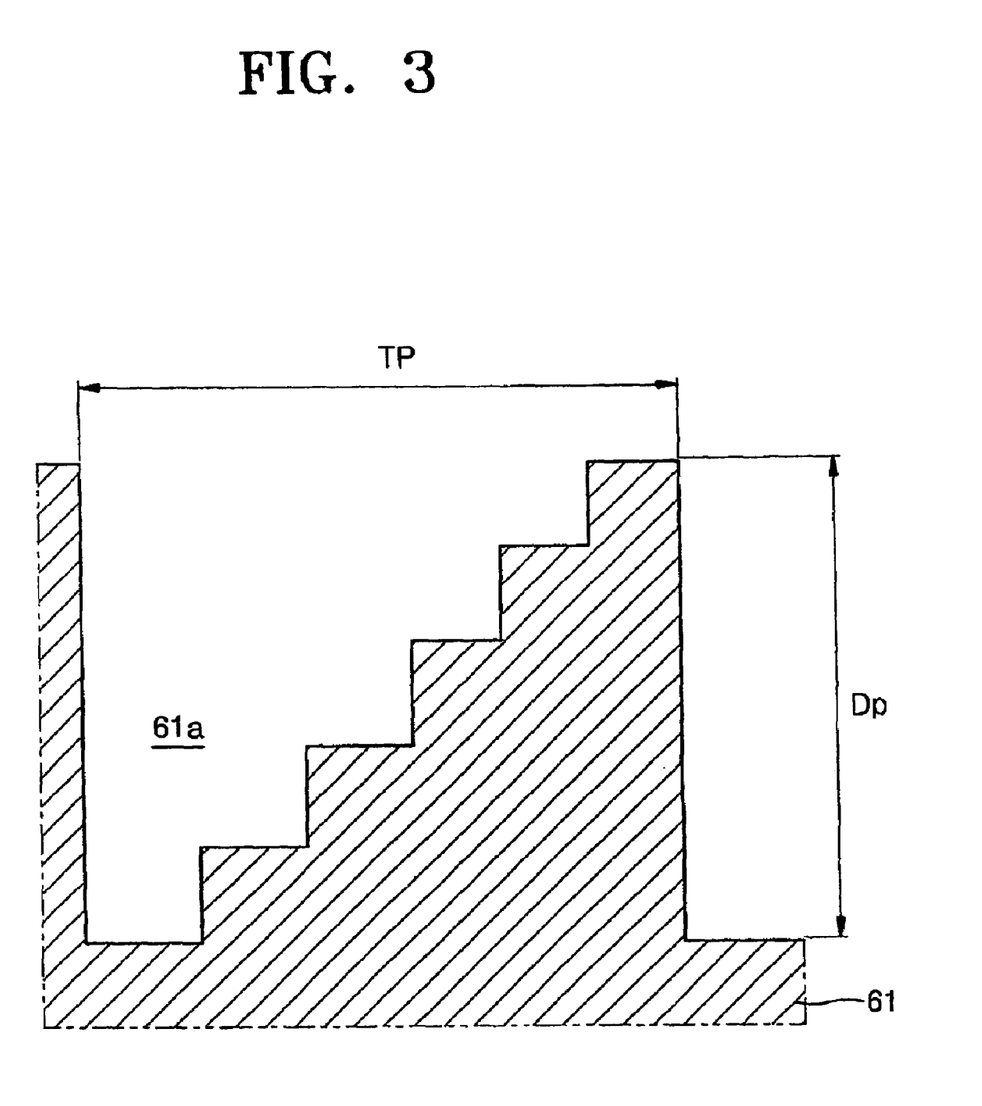
FIG. 3 is a sectional view showing the pattern of a hologram light coupler used in the optical pickup according to an embodiment of the present invention.
Figure 4:
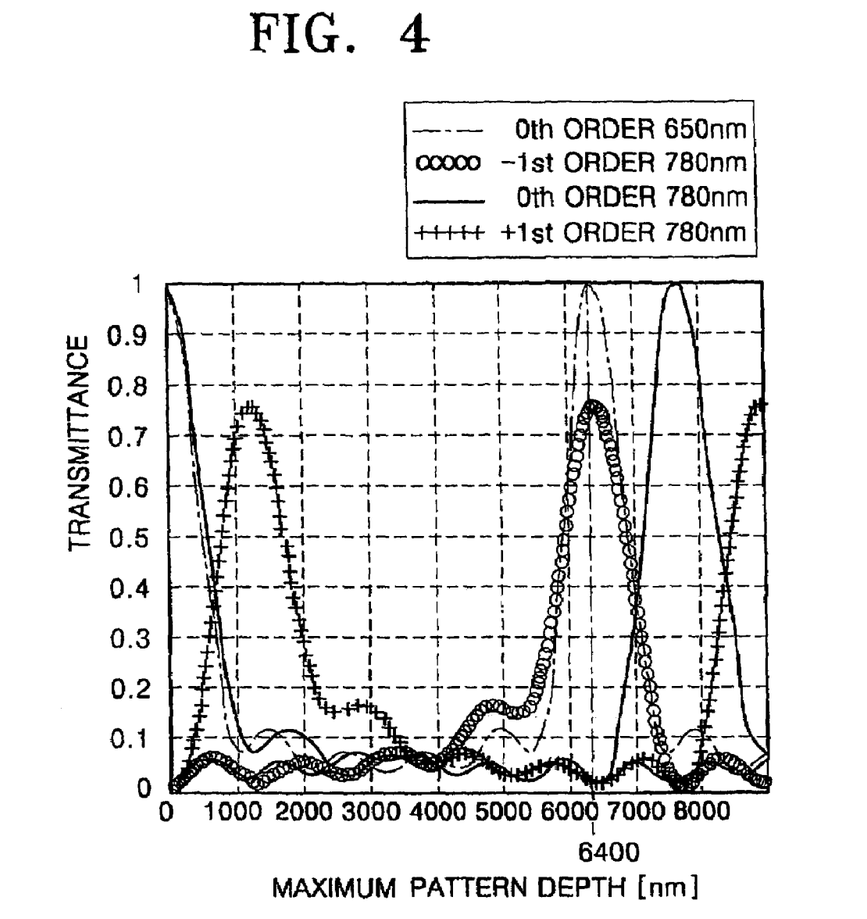
FIG. 4 is a graph showing variations of transmittance with respect to the pattern depth of the hologram light coupler of FIG. 3.
Figure 5:
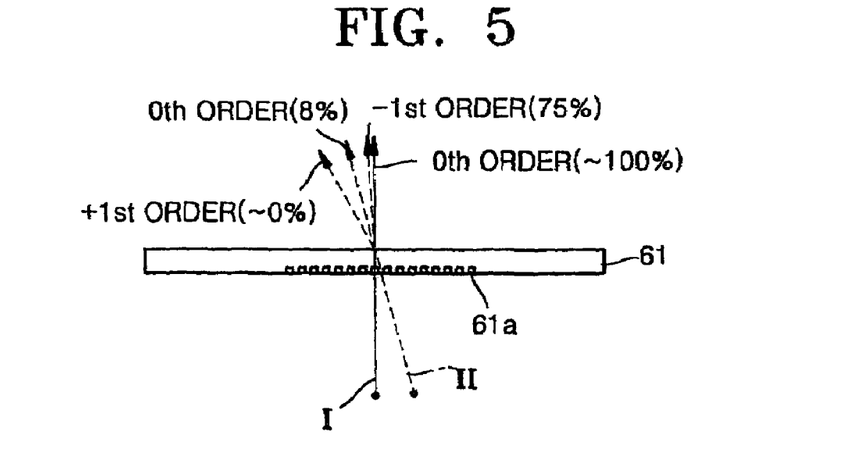
FIG. 5 illustrates the diffraction efficiency of the hologram light coupler of FIG. 3.

FIG. 3 illustrates an example of the hologram pattern 61a having five steps, and FIG. 4 illustrates variations of transmittance of the first and second light beams I and II with respect to the variations of maximum pattern depth $D_p$ of the hologram pattern 61a of FIG. 3. Referring to FIG. 4, at a maximum pattern depth $D_p$ of about 6,400 nm, the transmittance of the hologram light coupler 61 is about 1.0 for the principle zeroth order maximum of the first light beam I having a 650 nm wavelength. The second light beam II is diffracted and transmitted into zeroth order and 1st order diffracted beams. As shown in FIG. 5, the transmittance of the hologram light coupler 61 is about 8% for the zeroth order diffracted beam, almost 0% for the $+1^{st}$ order diffracted beam, and about 75% for the $-1^{st}$ order diffracted beam with respect to the amount of the incident light. The $-1^{st}$ order diffracted beam serves as the effective beam for the second light beam II, and travels parallel to the zeroth order diffracted beam from the first light beam I.

While the $-1^{st}$ order light of the second light beam II is shown in FIG. 5 as being slightly non-parallel to the $0^{th}$ order light of the first light beam I, this non-parallel depiction is for the purposes of clarity.

As previously mentioned, the hologram light coupler 61 is appropriately located on the optical path such that the first and second light beams I and II from the first and second light beam sources 55 and 57, which are installed in the light device module 50 but at different angles with respect to the optical axis, are guided along the same optical path and go toward the optical recording medium 80.

Figure 6:
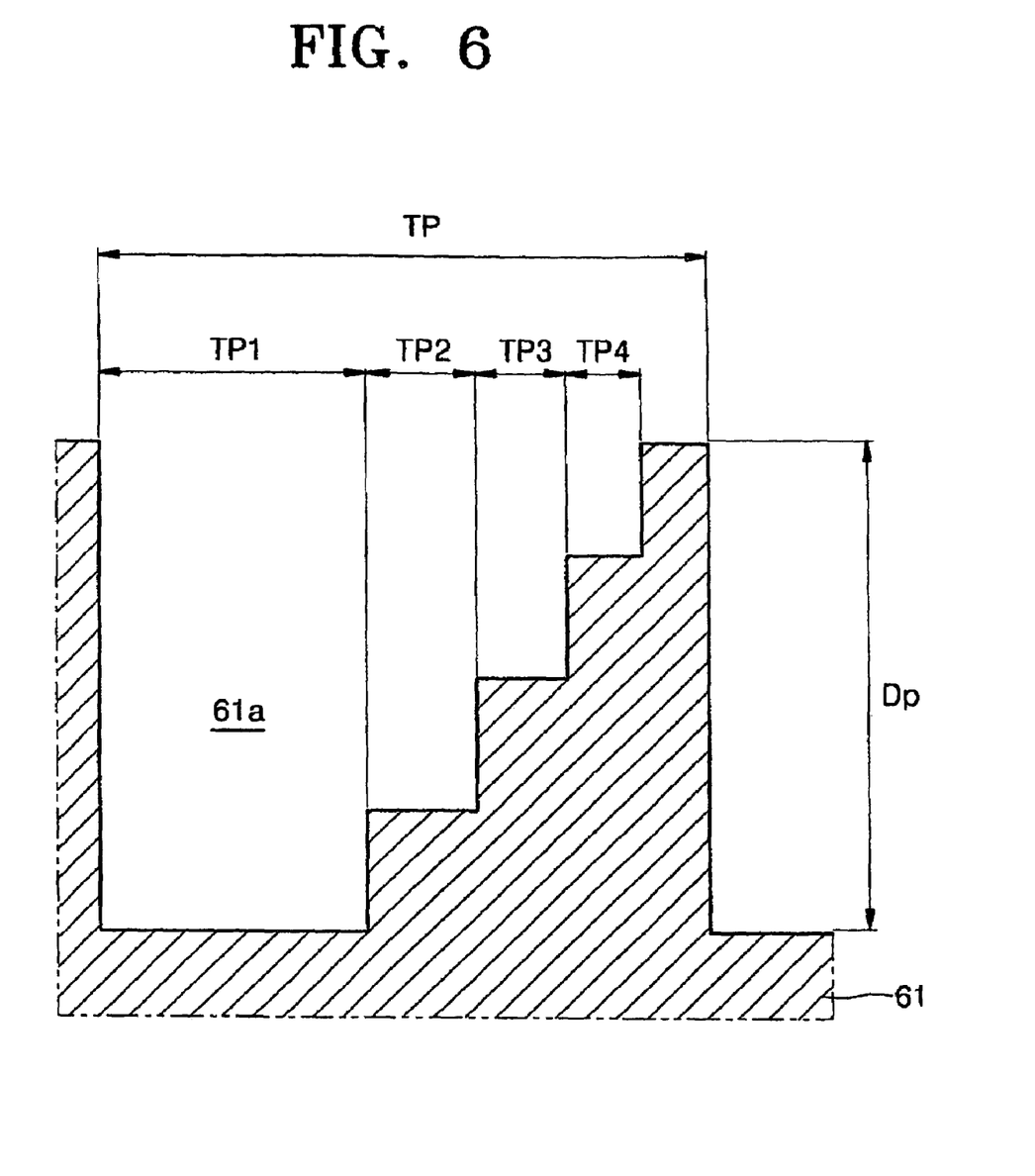
FIG. 6 is a sectional view showing the pattern of another hologram light coupler used in the optical pickup according to another embodiment of the present invention.
Figure 7:
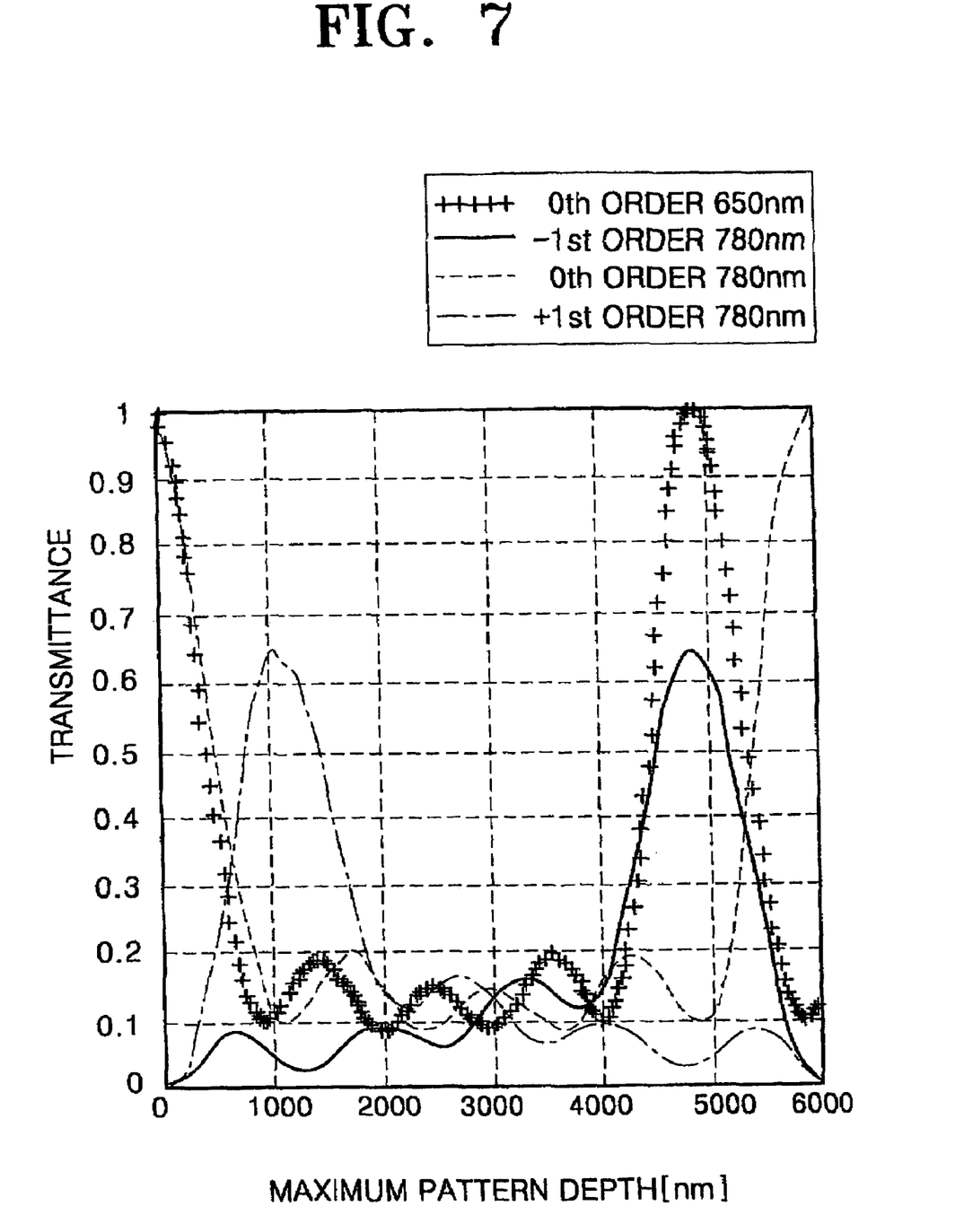
FIG. 7 is a graph showing variations of transmittance with respect to the pattern depth of the hologram light coupler of FIG. 6.
Figure 8:
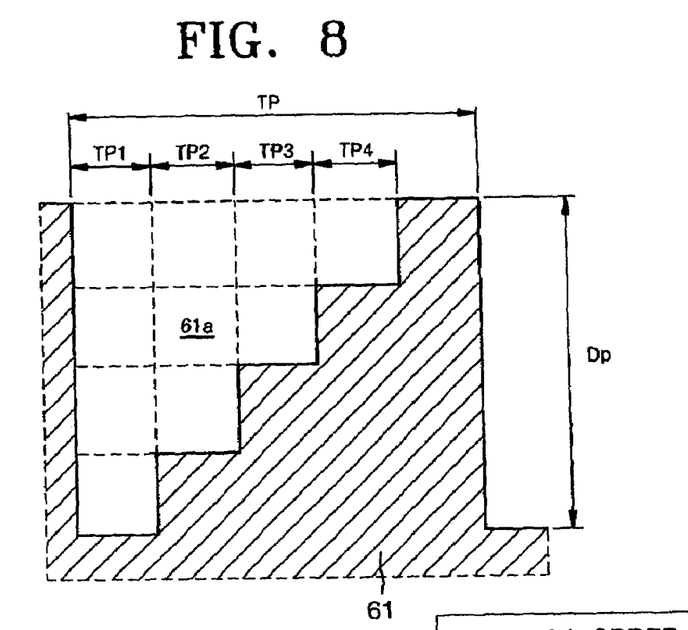
FIG. 8 is a sectional view showing the pattern of yet another hologram light coupler adopted in the optical pickup according to yet another embodiment of the present invention.
Figure 10:
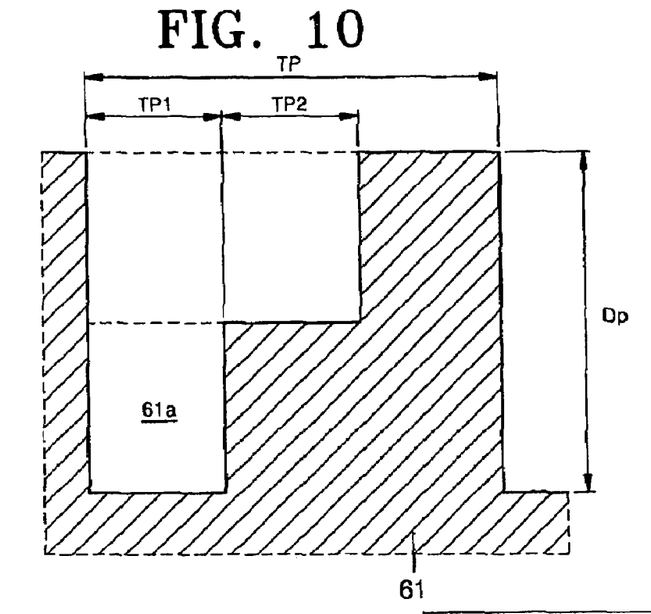
FIG. 10 is a sectional view showing the pattern of still another hologram light coupler adopted in the optical pickup according to still another embodiment of the present invention.

Although the hologram light coupler 61 of FIG. 3 has a 5-step hologram pattern, the hologram pattern of the hologram light coupler 61 can be varied as shown in FIGS. 6, 8 and 10. FIG. 6 illustrates a 4-step hologram pattern 61a for the hologram light coupler 61, and FIG. 7 illustrates variations of transmittance for the first and second light beams I and II with respect to the maximum pattern depth $D_p$. In designing the hologram pattern 61a shown in FIG. 6, the phase of the light beam is also considered. For the 4-step hologram pattern of FIG. 6, the pitch TP1 at the maximum pattern depth $D_p$ is larger than the pitches TP2, TP3 and TP4 for the other steps.

Referring to FIG. 7, at a maximum pattern depth $D_p$ of about 4,900 nm, the transmittance of the hologram light coupler 61 is about 1.0 for the zeroth order maximum of the first light beam I having a 650 nm wavelength. The second light beam II is diffracted and transmitted into zeroth order and $-1^{st}$ order diffracted beams. The transmittance of the hologram light coupler 61 is about 10% for the zeroth order diffracted beam, almost 0% for the $+1^{st}$ order diffracted beam, and about 65% for the $-1^{st}$ order diffracted beam with respect to the amount of the incident light. The $-1^{st}$ order diffracted beam serves as the effective beam for the second light beam II, and travels parallel to the zeroth order diffracted beam from the first light beam I.

Figure 9:
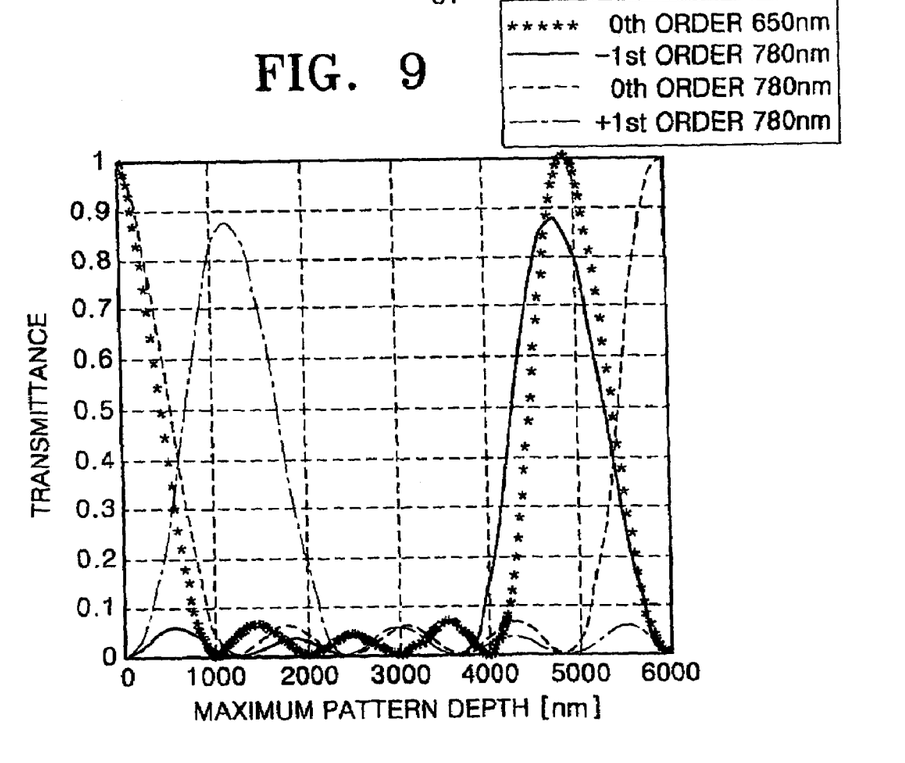
FIG. 9 is a graph showing variations of transmittance with respect to the pattern depth of the hologram light coupler of FIG. 8.

FIG. 8 illustrates another 4-step hologram pattern 61a for the hologram light coupler 61 in which no phase of light beam is considered, and FIG. 9 illustrates variations of transmittance for the first and second light beams I and II with respect to the maximum pattern depth $D_p$. For the 4-step hologram pattern of FIG. 8, the pitch TP1 at the maximum pattern depth $D_p$ is equal to the pitches TP2, TP3 and TP4 for each of the other steps.

Referring to FIG. 9, at maximum pattern depth $D_p$ of about 4,900 nm, the transmittance of the hologram light coupler 61 is about 1.0 for the zeroth order maximum of the first light beam I having a 650 nm wavelength. The transmittance of the hologram light coupler 61 is almost 0% for both the zeroth order diffracted beam and $+1^{st}$ order diffracted beam from the second light beam II, and about 86% for the $-1^{st}$ order diffracted beam with respect to the amount of the incident light. The $-1^{st}$ order diffracted beam serves as the effective beam for the second light beam II, and travels parallel to the zeroth order diffracted beam from the first light beam I. While not shown, it is understood that other non-zeroth order lights may serve as the effective beam for the second light beam II.

Figure 11:
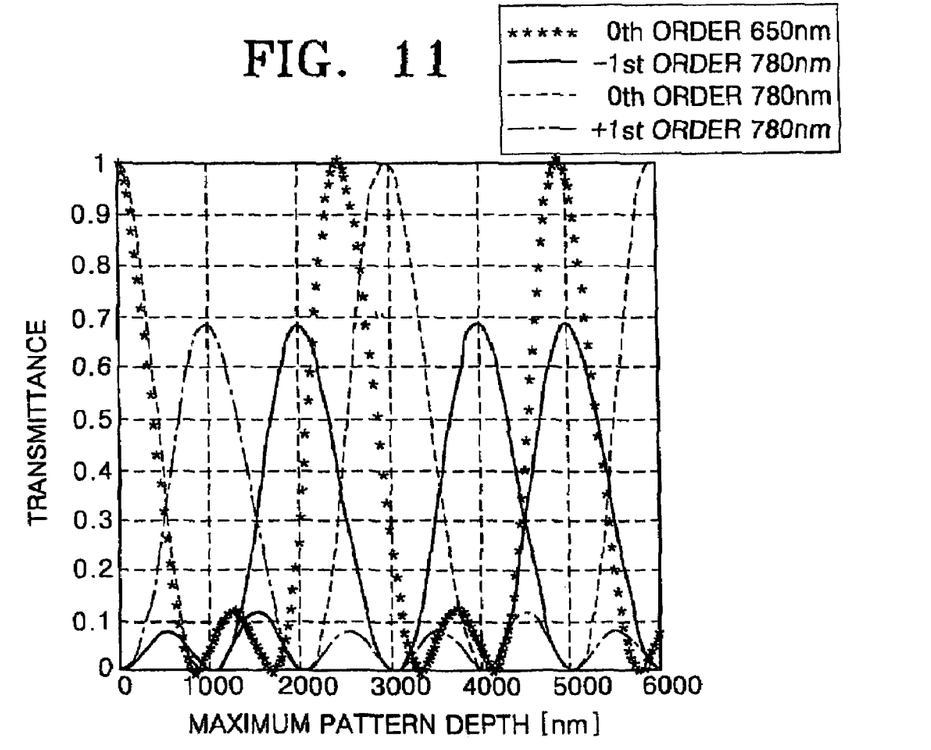
FIG. 11 is a graph showing variations of transmittance with respect to the pattern depth of the hologram light coupler of FIG. 10.

FIG. 10 illustrates a 2-step hologram pattern 61a for the hologram light coupler 61, in which no phase of light beam is considered, and FIG. 11 illustrates variations of transmittance for the first and second light beams I and II with respect to the maximum pattern depth $D_p$. For the 2-step hologram pattern of FIG. 10, the pitch TP1 at the maximum pattern depth $D_p$ is equal to the pitch TP2 of the other step of the hologram pattern.

Referring to FIG. 11, at a maximum pattern depth $D_p$ of about 4,900 nm, the transmittance of the hologram light coupler 61 is about 1.0 for the zeroth order maximum of the first light beam I of wavelength 650 nm. The transmittance of the hologram light coupler 61 is almost 0% for both the zeroth order diffracted beam and $+1^{st}$ order diffracted beam from the second light beam II, and about 68% for the 1st order diffracted beam with respect to the amount of the incident light. The $-1^{st}$ order diffracted beam serves as the effective beam for the second light beam II, and travels parallel to the zeroth order diffracted beam from the first light beam I.

As can be inferred from the embodiments of the hologram pattern 61a for the hologram light coupler 61 illustrated above, the maximum pattern depth $D_p$ of the hologram light coupler 61 can be varied according to the stepped configuration. It is preferable that the maximum hologram depth $D_p$ of the hologram light coupler 61 satisfies the expression: 4,000 nm$\leq D_p \leq$7,000 nm.

As previously mentioned, the zeroth order diffracted beam is utilized as the effective beam for the first light beam I, and the $-1^{st}$ order diffracted beam is utilized as the effective beam for the second light beam II. For this reason, the first and second light beams I and II emerging from the different light beam sources 55 and 57 separated from each other can travel on the same optical path. The first and second light beams I and II pass through the hologram light coupler 61 to diverge at different angles, so that the first light beam I is focused on the thin optical disc 80a and the second light beam II is focused on the thick optical disc 80b.

While not shown, it is understood that the first light beam I and the second light beam II could both be diffracted by the hologram light coupler 61. For instance, it would be possible for both the first and second light beams I and II be incident at non-perpendicular angles such that the $-1^{st}$ order light of the first light beam is parallel to the $-1^{st}$ order light of the second light beam.

Turning to FIG. 2, the optical path changing unit 63 comprises a polarization beam splitter (PBS) 63 to selectively alter the optical path of incident light beams by transmitting or reflecting incident light beams according to their polarization, and a quarter-wave plate 65, which is disposed on the optical path between the PBS 63 and the objective lens 67, to change a polarization of the incident light beams. The light beams emitted from the light device module 50 pass through the PBS 63 and go toward the optical recording medium 80.

As a light beam heads toward the optical recording medium 80, and the light beam reflected from the optical recording medium 80 passes through the quarter-wave plate 65, the polarization of incident light beam changes. After the light beam reflected by the optical recording medium 80 is incident on the PBS 63, the incident light beam is reflected by the PBS 63 such that it goes toward the photodetector 71.

Figure 12:
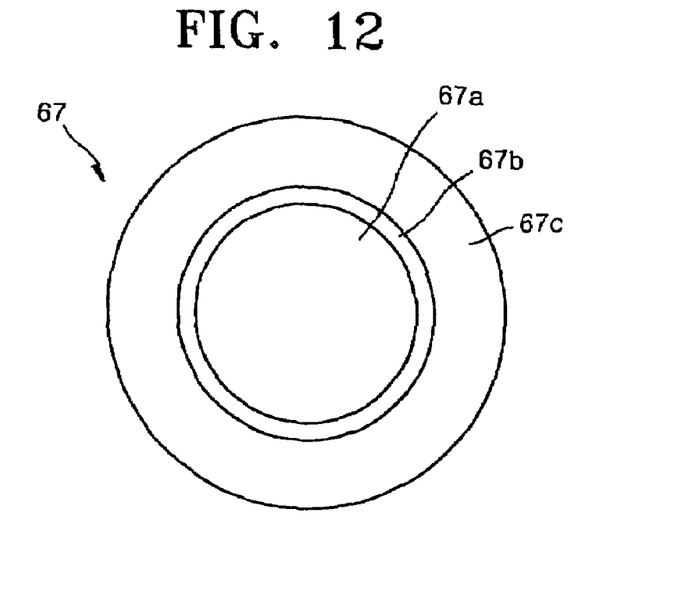
FIG. 12 is a schematic front view of an objective lens used in the compatible optical pickup according to an embodiment of the present invention.
Figures 13A, 13B:
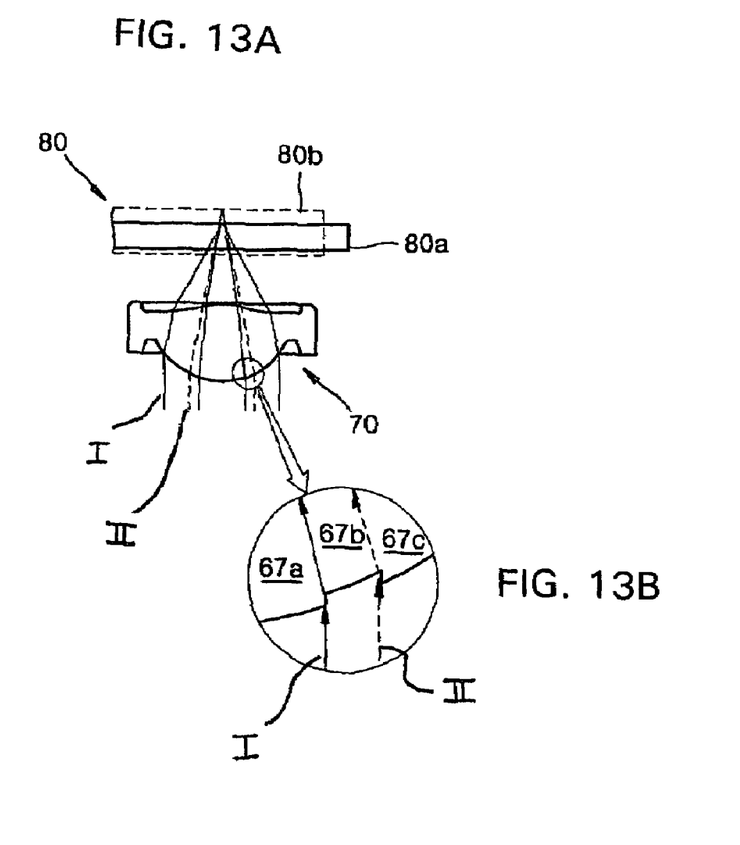
FIGS. 13A and 13B are schematic views showing the objective lens focusing light according to an embodiment of the present invention.

The objective lens 67 focuses the incident first or second light beams I and II on the corresponding thin optical disc 80a or the thick optical disc 80b. To achieve this, the objective lens 67 has a light receiving surface to receive light emitted from the light device module 50, and a light emitting surface disposed opposite the optical recording medium 80. It is preferable that at least one of the light receiving and transmitting surfaces is divided into concentric sections by at least one annular region. As shown in FIGS. 2, 12 and 13, each of the sections has a different aspheric curvature such that light beams passed through the sections can be focused at different positions.

In particular, referring to FIGS. 12 and 13, the objective lens 67 includes a near-axis region 67a, an annular lens region 67b, and a far-axis region 67c. The annular lens region 67b located between the near-axis region 67a and the far-axis region 67c is curved, and may be formed as a circular or elliptical ring. The annular lens region 67b has an aspherical surface. It is preferable that the annular lens region 67b is optimized for the thick optical disc 80b.

When the thin optical disc 80a is used as the optical recording medium 80, the light beam I emitted from the first light beam source 55 is focused as a light spot on the information recording surface of the thin optical disc 80a through the far-axis region 67c. In contrast, the portion of the light beam I emerging from the annular lens region 67b is scattered.

On the other hand, when the thick optical disc 80b is used as the optical recording medium 80, the second light beam II emitted from the second light beam source 55 is focused as a light spot on the information recording surface of the thick optical disc 80b through both the annular lens region 67b and the near-axis region 67a.

While not shown, it is understood that there are other mechanisms by which this focusing can be accomplished. For instance, it is understood that it would be possible to perform the selective focusing by adjusting the focal length/working distance between optical discs 80a and 80b and the objective lens 67.

As shown in FIG. 2, the optical pickup further includes the collimating lens 66 on the optical path between the objective lens 67 and the quarter-wave plate 65, to collimate incident light. However, it is understood that a collimating leans 66 is not required in all instances.

The photodetector 71 receives the first light beam I or second light beam II light incident from the optical path changing unit 63 after having been reflected from the optical recording medium 80, and detects an information signal and error signals from the incident light. A sensor lens 69 to cause an astigmatism to the incident light is disposed on the optical path between the PBS 63 and the photodetector 71. However, it is understood that the sensor lens 69 and/or the PBS 63 need not be used in all instances, such as when the photodetector 71 is mounted on the mount 53.

Further, it is understood that the locations of the photodetector 71 and the light module 50 might be exchanged such that the optical path changing unit 63 reflects the first and second light beams I and II from the light module, and transmits the first and second light beams I and II reflected from the optical disc 80.

As previously mentioned, the optical pickup according to the present invention, which is compatible with recording media having different formats, uses a single light device module in which first and second light beam sources having different wavelengths of light are installed, and uses a hologram light coupler such that light beams from the first and second light beam sources, which are separated from each other, are guided along the same optical path. In addition, the optical pickup according to the present invention detects an information signal and error signals with a single photodetector. Thus, the configuration of the optical pickup becomes compact and simplified.

While this invention has been particularly shown and described with reference to preferred embodiments thereof, it will be understood by those skilled in the art that various changes in form and details may be made therein without departing from the spirit and scope of the invention as defined by the claims and their equivalents.

What is claimed is:

1. An optical pickup in an optical device compatible with first and second recording media having different formats, the optical pickup comprising:
   a light device module to selectively emit first and second light beams corresponding to the respective first and second recording media, said light device module to selectively emit the first and second light beams according to which one of the first and second recording media is received in the optical device;
   an objective lens disposed on a common optical path of the first and second light beams to focus the selectively emitted first and second light beams on the respective first and second recording media, the objective lens having a surface with at least one region having a different aspheric curvature from an aspheric curvature of another section of the surface such that the first and second light beams are focused on the respective first and second recording media;
   a photodetector to receive the first and second light beams reflected from the respective first and second recording media, and to detect a signal from the received first and second light beams;
   an optical path changing unit to selectively direct the first and second light beams reflected from the respective first and second recording media; and
   a light coupler to receive the first and second light beams from the light device module incident at different angles on a surface, and to transmit and/or diffract portions of the received first and second light beams along the common optical path, the light coupler being disposed between the light device module and the optical path changing unit.

2. The optical pickup of claim 1, wherein said light device module includes a first light source to emit the first light beam and a second light source to emit the second light beam.

3. The optical pickup of claim 1, wherein said photodetector receives the first or second light beams reflected from the corresponding one of the first and second recording media along a reflected optical path common to the reflected first and second light beams.

4. The optical pickup of claim 1, wherein the light coupler comprises a stepped pattern having a maximum pattern depth of greater than or equal to about 4000 nm.

5. The optical pickup of claim 1, wherein the light coupler comprises a stepped pattern having a maximum pattern depth of less than or equal to about 7000 nm.

6. The optical pickup of claim 1, wherein the light coupler comprises a stepped pattern comprising 2 steps,
   wherein a pitch of the step at a maximum pattern depth is equal to the pitch of the other step.

7. The optical pickup of claim 1, wherein the light coupler comprises a stepped pattern comprising 4 steps,
   wherein a pitch of the step at a maximum pattern depth is larger than the pitches of the other steps.

8. The optical pickup of claim 1, wherein the light coupler comprises a stepped pattern comprising 4 steps,
   wherein a pitch of the step at a maximum pattern depth is equal to the pitches of the other steps.

9. The optical pickup of claim 1, wherein the light coupler comprises a stepped pattern comprising 5 steps.

10. The optical pickup of claim 1, wherein a −1st order portion of one of the first and second light beams shares the common optical path with a 0 order portion of the other of the first and second light beams.

11. An optical pickup in an optical device compatible with first and second recording media having different formats, the optical pickup comprising:
   a light device module to selectively emit first and second light beams corresponding to the respective first and second recording media, said light device module to selectively emit the first and second light beams according to which one of the first and second recording media is received in the optical device;

an objective lens disposed on a common optical path of the first and second light beams to focus the selectively emitted first and second light beams on the respective first and second recording media, the objective lens having a surface with at least one region having a different aspheric curvature from an aspheric curvature of another section of the surface such that the first and second light beams are focused on the respective first and second recording media;

a photodetector to receive the first and second light beams reflected from the respective first and second recording media, and to detect a signal from the received first and second light beams;

an optical path changing unit to selectively direct the first and second light beams reflected from the respective first and second recording media; and a light coupler to receive the first and second light beams incident at different angles on a surface, and to transmit and/or diffract portions of the received first and second light beams along the emitting optical path, the light coupler being disposed between the light device module and the optical path changing unit and having a stepped pattern, the stepped pattern having at least two steps.

* * * * *